(No Model.)
P. JABLOCHKOFF.
SECONDARY ELECTRIC BATTERY.
No. 248,654. Patented Oct. 25, 1881.
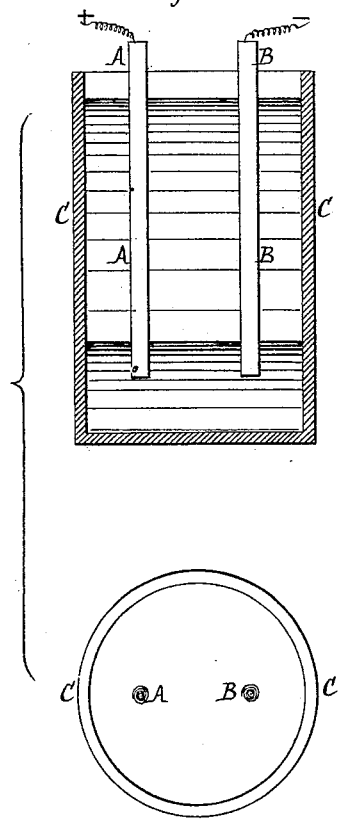
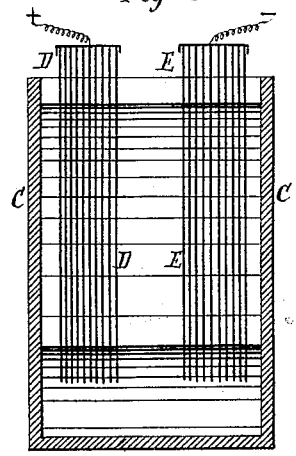
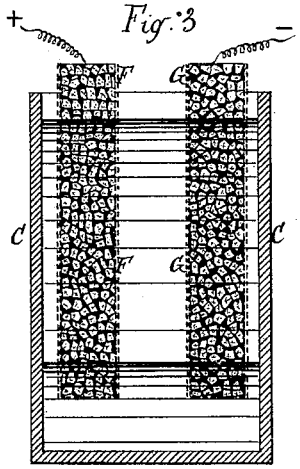
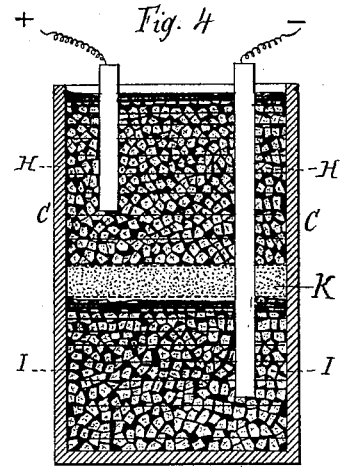
Witnesses
C. J. Hedrick
Ph. Silleau
Paul Jablochkoff by
A Pollok
his attorney

United States Patent Office.

PAUL JABLOCHKOFF, OF PARIS, FRANCE, ASSIGNOR TO THE SOCIÉTÉ GÉNÉRALE D'ELECTRICITÉ, PROCÉDÉS JABLOCHKOFF, OF SAME PLACE.

SECONDARY ELECTRIC BATTERY.

SPECIFICATION forming part of Letters Patent No. 248,654, dated October 25, 1881.

Application filed June 4, 1881. (No model.) Patented in France April 13, 1881.

*To all whom it may concern:*

Be it known that I, PAUL JABLOCHKOFF, a citizen of the Russian Empire, residing in Paris, France, have invented a certain new and useful Improvement in Secondary Electric Batteries, of which the following is a specification.

This invention relates to batteries for accumulating electricity after the manner of secondary batteries, and is the result of special observations made by me upon the phenomenon of electric polarization and upon the transformation of electricity from a dynamic to a static condition, and conversely.

In secondary batteries heretofore made the polarization is due to the deposit upon the plates forming the electrodes of bubbles of gas from the decomposition of the liquids employed. To increase the power of these batteries Mr. Planté conceived the idea of depositing upon the electrodes of metal or other materials a layer of oxide, that renders the surface at once irregular and porous. The pores thus formed have the effect of enlarging the surface, but they do not increase the polarizing capacity of the electrodes, because, as has been demonstrated, polished surfaces become polarized most strongly.

In the present invention the surfaces of the electrodes, whatever their nature and form may be, are more apt to become polarized by covering them with oil or other matters of an oleaginous, fatty, or resinous nature, and particularly with hydrocarbons and mineral oils, such as naphtha and its compounds. These bodies, from their nature, also retain the electric charges on the electrodes, by acting in some sort like the oily and resinous varnishes which form the surfaces of electrophores and condensers of static electricity. Thus, by the intervention of these bodies in the secondary batteries, I add to the chemical action of polarization the effects of condensation of static electricity. That this double action takes place can be shown by removing the electrodes of the improved battery, when made of suitable form, when it will be seen that they will act as bodies charged with static electricity of positive or negative electricity.

In order to show more clearly the manner of carrying the invention into effect, four forms of battery embodying the invention will be described, by the aid of the accompanying drawings, which form a part of this specification. The four figures each represent one of said forms.

The battery shown in Figure 1 consists of two polished metal plates, A B, (of silver, for example,) rolled into a spiral and placed in the vessel C, which contains water and oil, so as to be partly in the water and partly in the oil. The oil occupies the upper part of the vessel and constitutes the larger part of the bath, as clearly shown in the upper view of the figure. The spiral form of metal plates is represented in the lower view.

In the second disposition, Fig. 2, the electrodes D E are formed each of a number of fine wires, connected at the upper ends and immersed in the water and in the oil in vessel C.

The electrodes in the third disposition, Fig. 3, consist of two metal receptacles, F G, filled with coke.

In the fourth disposition, Fig. 4, the vessel C is divided, by means of a partition or diaphragm, K, of cloth, wadding, a layer of sand, or other material, into two compartments, H I, which are filled with coke. The partition or diaphragm has no other object than to prevent direct contact of the two electrodes with each other. The vessel is filled with a mixture of oil and water, or other liquid, such as an ammoniacal solution, so that the two masses of coke and the diaphragm are immersed in the mixture. The oil and water or ammoniacal solution, being thoroughly intermingled and diffused through the mass of coke, do not stratify or separate completely the one from the other, but remain more or less intimately mixed in the two compartments. The conductor leading from the lower electrode is, in passing through the upper compartment, suitably insulated from the material therein contained, which constitutes the upper electrode.

In the batteries shown in Figs. 3 and 4 the electrodes can be removed separately, and, being isolated, will preserve the charges of electricity of the polarity desired.

It results from the construction of the improved batteries, as described, that they have a very considerable resistance, and consequently possess the advantage of discharging slowly. The resistance can, however, be altered at will by changing the composition and proportions of the liquids employed. If it be desired to quicken the discharge, it suffices to add to the liquids such salts as will simply have the effect of diminishing the internal resistance. Another advantage of the improved batteries is the capacity for receiving without alteration a charge from currents of very high tension, and requiring but a small time for the accumulation of electricity, while possessing the faculty of discharging very slowly.

It is obvious that various modifications may be made in the details of arrangement, the forms, dispositions, and proportions of the various parts, and that the electrodes may be of any desired metal or of any other suitable material.

Having now fully described my said invention and the manner of carrying the same into effect, what I claim is—

1. As a means for increasing the polarizing power and retarding the electric discharge in secondary batteries, oily, fatty, and resinous materials, and specially hydrocarbons and mineral oils, such as naphtha, substantially as described.

2. The combination, with the electrodes of a secondary battery, of hydrocarbon or other oil or fatty or resinous material, substantially as and for the purpose described.

3. A secondary battery comprising an inclosing-receptacle, two electrodes, of metal, of coke, or of other suitable material or materials, and a bath of water or equivalent liquid, and oily, fatty, or resinous material, particularly a hydrocarbon oil, such as naphtha, substantially as described.

In witness whereof I have hereunto signed my name in the presence of two subscribing witnesses.

PAUL JABLOCHKOFF.

Witnesses:
ROBT. M. HOOPER,
CHARLES MARDELET.